United States Patent
Srinivasan et al.

(10) Patent No.: US 9,306,865 B2
(45) Date of Patent: Apr. 5, 2016

(54) VIRTUAL PORT MAPPINGS FOR NON-BLOCKING BEHAVIOR AMONG PHYSICAL PORTS

(71) Applicant: Oracle International Corporation, Redwood City, CA (US)

(72) Inventors: Arvind Srinivasan, San Jose, CA (US); Bjorn Dag Johnsen, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 190 days.

(21) Appl. No.: 14/206,962

(22) Filed: Mar. 12, 2014

(65) Prior Publication Data

US 2015/0263975 A1    Sep. 17, 2015

(51) Int. Cl.

| | |
|---|---|
| *H04L 5/12* | (2006.01) |
| *H04L 12/863* | (2013.01) |
| *H04L 12/851* | (2013.01) |
| *H04L 12/935* | (2013.01) |
| *H04L 12/741* | (2013.01) |
| *G06F 13/40* | (2006.01) |

(52) U.S. Cl.
CPC ........ *H04L 47/6205* (2013.01); *G06F 13/4022* (2013.01); *H04L 45/74* (2013.01); *H04L 47/24* (2013.01); *H04L 49/3045* (2013.01)

(58) Field of Classification Search
CPC .................................................. H04L 49/3045
See application file for complete search history.

(56) References Cited

U.S. PATENT DOCUMENTS

| | | |
|---|---|---|
| 8,315,187 B1 | 11/2012 | White |
| 2002/0093952 A1 | 7/2002 | Gonda et al. |
| 2008/0219269 A1 | 9/2008 | Minkenberg et al. |
| 2012/0027022 A1* | 2/2012 | Birkedahl ........... H04L 12/4641 370/401 |
| 2013/0107713 A1* | 5/2013 | Campbell ............. H04L 49/355 370/235 |
| 2013/0188647 A1* | 7/2013 | Herrell .................... H04L 45/02 370/392 |

* cited by examiner

*Primary Examiner* — Shaq Taha
(74) *Attorney, Agent, or Firm* — Park, Vaughan, Fleming & Dowler LLP; Chia-Hsin Suen

(57) ABSTRACT

The disclosed embodiments provide a system that operates a switch fabric. During operation, the system creates a set of virtual links for a first set of physical ports in the switch fabric. Next, the system uses a set of virtual port numbers to create a set of mappings between the set of virtual links and a second set of physical ports in the switch fabric, wherein the second set of physical ports is connected to the first set of physical ports using a single physical link. The system then uses the mappings to provide non-blocking behavior in traffic from the first set of physical ports to the second set of physical ports.

14 Claims, 4 Drawing Sheets

VIRTUAL PORT MAPPINGS FOR NON-BLOCKING BEHAVIOR AMONG PHYSICAL PORTS

BACKGROUND

1. Field

The disclosed embodiments relate to switch fabrics. More specifically, the disclosed embodiments relate to techniques for performing virtual port mappings to provide non-blocking behavior among physical ports in switch fabrics.

2. Related Art

Switch fabrics may be used to route traffic among servers in data centers. For example, an InfiniBand (InfiniBand™ is a registered trademark of InfiniBand Trade Association Corp.) switch fabric may connect processor and storage nodes in a data center using point-to-point, bidirectional serial links. The InfiniBand switch fabric may also provide Quality of Service (QoS) and reliability, availability, and serviceability (RAS) to the nodes.

In addition, gateways connected to the switch fabrics may improve data center efficiency and/or network consolidation. For example, an Ethernet gateway may be added to an InfiniBand switch fabric in a data center to allow a server in the data center to connect to an Ethernet Local Area Network (LAN) using a single physical adapter and cable. Traffic streams associated with virtual machines in the data center may thus include a mix of high-throughput, low-latency InfiniBand traffic and high-throughput Ethernet traffic carried over the InfiniBand communication medium.

However, a gateway connected to a switch fabric may include a set of physical ports that is connected to another set of physical ports in the switch fabric using a single physical link. For example, an Ethernet gateway in an InfiniBand switch fabric may appear as a target channel adapter (TCA) connected to a switch port, causing all Ethernet ports on the gateway to share a single InfiniBand link. From a software standpoint, the TCA may appear with one uplink port facing the switch and one or more downlink ports facing the Ethernet fabric. Because the single physical link may feed into multiple downlink ports, the downlink ports may exhibit head-of-line blocking. Such blocking behavior may be caused by bursty traffic patterns targeting multiple gateway ports and/or latency at individual gateway ports. As a result, the overall speed of the gateway may be limited to the slowest speed of any individual gateway port.

To alleviate such blocking behavior, only one gateway port may be connected to each physical link in the switch fabric. However, such a solution may be expensive and difficult to scale. Consequently, use of gateways connected to switch fabrics with single physical links may be facilitated by mechanisms for efficiently resolving blocking behavior among multiple physical ports in the gateways.

SUMMARY

The disclosed embodiments provide a system that operates a switch fabric. During operation, the system creates a set of virtual links for a first set of physical ports in the switch fabric. Next, the system uses a set of virtual port numbers to create a set of mappings between the set of virtual links and a second set of physical ports in the switch fabric, wherein the second set of physical ports is connected to the first set of physical ports using a single physical link. The system then uses the mappings to provide non-blocking behavior in traffic from the first set of physical ports to the second set of physical ports.

In some embodiments, using the set of virtual port numbers to create the set of mappings between the set of virtual links and the second set of physical ports in the switch fabric involves:

(i) creating a first mapping from a unique destination identifier associated with one or more ports in the second set of physical ports to a virtual port number;
(ii) creating a second mapping from a service level associated with a packet to a virtual link from the set of virtual links; and
(iii) associating the virtual port number and the virtual link with a virtual output queue (VOQ) of a physical port from the second set of physical ports.

In some embodiments, using the mappings to provide non-blocking behavior in traffic from the first set of physical ports to the second set of physical ports involves using the first and second mappings to place a packet comprising the unique destination identifier and the service level in the VOQ, and removing the packet from the VOQ based on a fullness of an output buffer for the physical port.

In some embodiments, removal of the packet from the VOQ is further based on a Quality of Service (QoS) level associated with the VOQ.

In some embodiments, the QoS level is associated with at least one of the service level and the virtual port number.

In some embodiments, each of the second set of physical ports is associated with one or more of the virtual links.

In some embodiments, the switch fabric includes an InfiniBand switch fabric and an Ethernet gateway.

In some embodiments, the first set of physical ports includes InfiniBand ports, and the second set of physical ports includes Ethernet ports.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
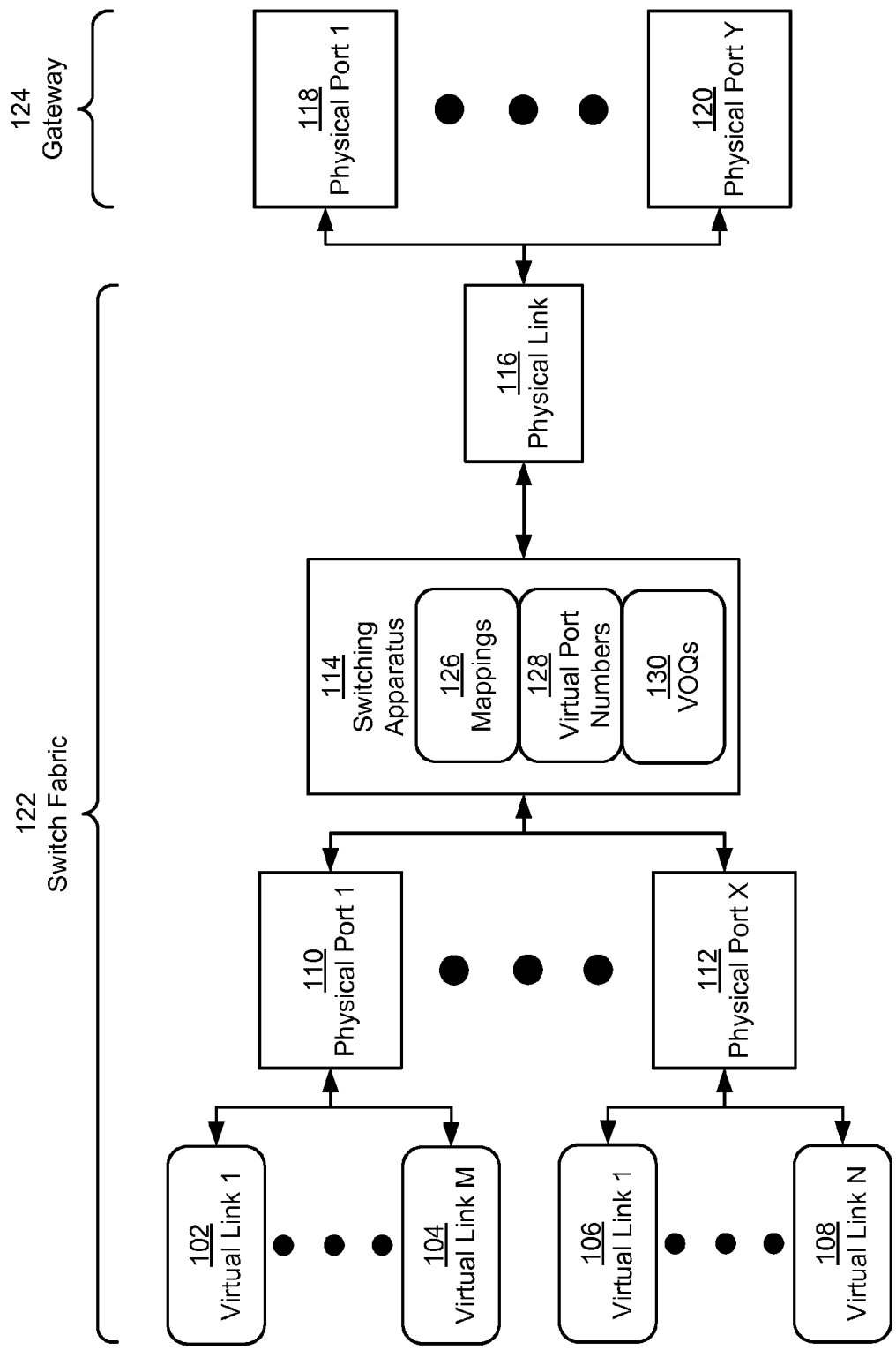
FIG. 1 shows a switch fabric in accordance with the disclosed embodiments.

The disclosed embodiments provide a method and system for operating a switch fabric. As shown in FIG. 1, a switch fabric 122 may include a first set of physical ports (e.g., physical port 1 110, physical port x 112), as well as a gateway 124 containing a second set of physical ports (e.g., physical port 118, physical port y 120) connected to the first set of physical ports using a single physical link 116. For example, switch fabric 122 may be an InfiniBand (InfiniBand™ is a registered trademark of InfiniBand Trade Association Corp.) switch fabric that connects multiple servers and/or virtual machines in a data center, and gateway 124 may be an Ethernet gateway. Because the Ethernet gateway appears as a target channel adapter (TCA) connected to a switch port in the InfiniBand switch fabric, Ethernet ports in the Ethernet gateway may effectively share a single InfiniBand link.

Those skilled in the art will appreciate that physical link 116 may cause physical ports in gateway 124 to experience head-of-line blocking. For example, an older packet destined for a busy port in gateway 124 may block newer packets destined for other ports in gateway 124, even if the other ports are not busy. As a result, the bandwidth available to all ports in gateway 124 may be limited by the bandwidth of the slowest port in gateway 124. For example, gateway 124 may include four 10-Gigabit Ethernet ports, which should provide a total bandwidth of 40 Gigabits. However, head-of-line blocking among the Ethernet ports may limit the bandwidth of gateway 124 to that of a single 10-Gigabit Ethernet port.

In one or more embodiments, switch fabric 122 includes functionality to provide non-blocking behavior in traffic to ports in gateway 124 without requiring changes to servers, virtual machines, and/or other environments from which the traffic is received. To enable such non-blocking behavior, a switching apparatus 114 in switch fabric 122 may create a set of virtual links (e.g., virtual link 1 102, virtual link m 104, virtual link 1 106, virtual link n 108) for physical ports in switch fabric 122. For example, switching apparatus 114 may be provided by hardware and/or firmware on an InfiniBand switch, and a set of virtual links may be created in the InfiniBand switch by switching apparatus 114 as a set of InfiniBand virtual lanes (VLs).

Switching apparatus 114 may also create a set of mappings 126 between the set of virtual links and physical ports in gateway 124 using a set of virtual port numbers 128. For example, each physical port in gateway 124 may be represented by one or more virtual port numbers 128, which are mapped to one or more unique destination identifiers (e.g., destination addresses) in switch fabric 122. As a result, the virtual port numbers may be abstractions that enable identification of individual physical ports on gateway 124, even if the entire gateway 124 is assigned only one physical port number because of physical link 116. Physical ports in gateway 124 may additionally be associated with a set of mappings between a set of service levels and the virtual links in switch fabric 122.

Switching apparatus 114 may use the mappings to provide non-blocking behavior in traffic from the virtual links to physical ports in gateway 124. For example, switching apparatus 114 may associate the mappings with virtual output queues (VOQs) 130 that are used to provide the non-blocking behavior. Each VOQ may be associated with a virtual port number and a virtual link in switch fabric 122. As a result, switching apparatus 114 may provide enough VOQs per input physical port (e.g., physical port 1 110, physical port x 112) in switch fabric 122 to avert head-of-line blocking among output physical ports (e.g., physical port 1 118, physical port y 120) in gateway 124. Using mappings between virtual links and physical ports in switch fabrics to provide non-blocking behavior among the physical ports is described in further detail below with respect to FIG. 2.

Figure 2:
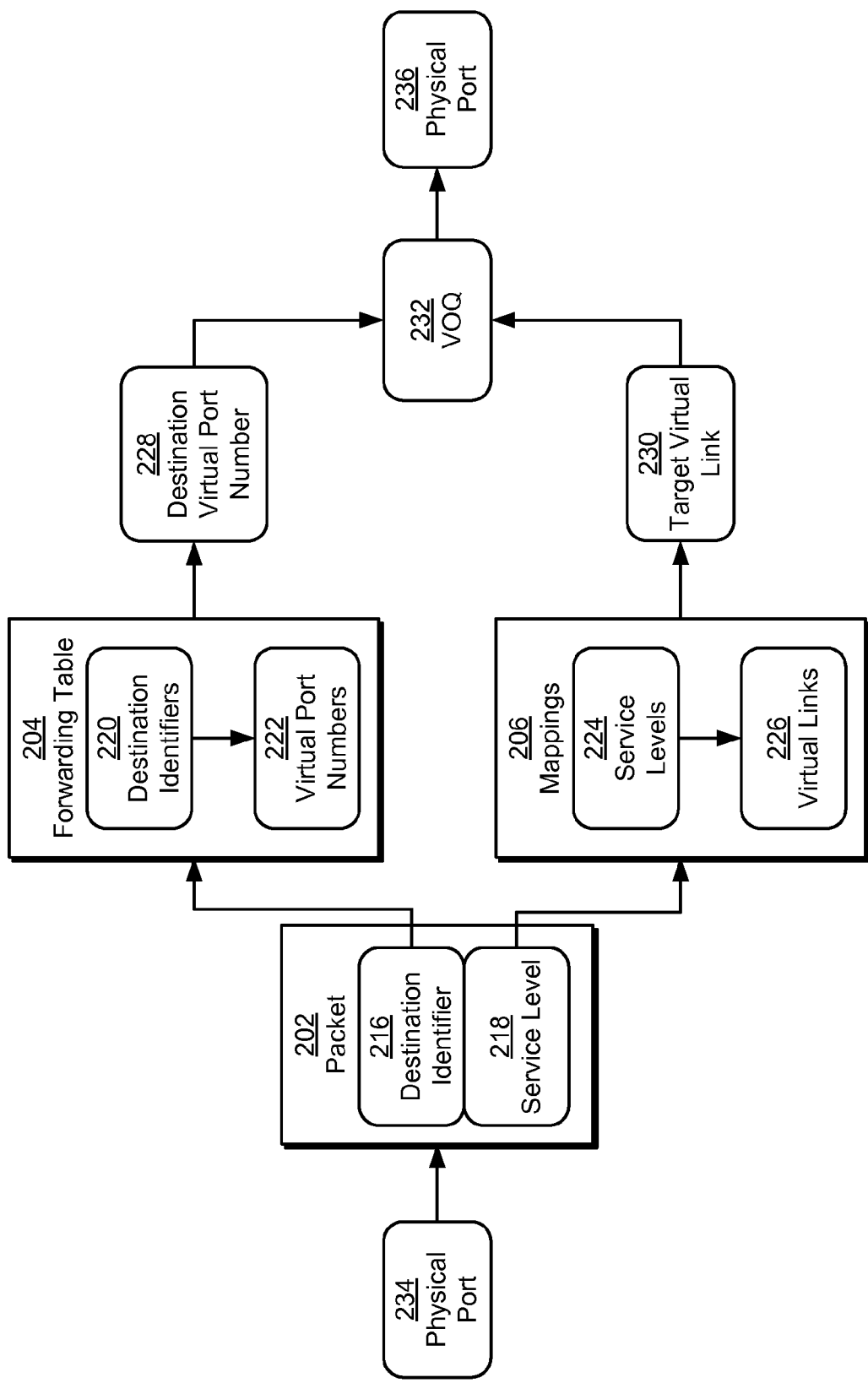
FIG. 2 shows the routing of a packet from a first physical port in a first set of physical ports to a second physical port in a second set of physical ports connected to the first set of physical ports by a single physical link in accordance with the disclosed embodiments.

FIG. 2 shows the routing of a packet 202 from a first physical port 234 in a first set of physical ports to a second physical port 236 in a second set of physical ports connected to the first set of physical ports by a single physical link in accordance with the disclosed embodiments. For example, packet 202 may be received from an InfiniBand physical port 234 in an InfiniBand switch fabric (e.g., switch fabric 122 of FIG. 1). Packet 202 may then be routed to an InfiniBand and/or Ethernet physical port 236 in a gateway connected to the switch fabric using a single physical link.

As shown in FIG. 2, packet 202 may be routed based on a unique destination identifier 216 and/or a service level 218 in packet 202. Destination identifier 216 may represent an address of the destination of packet 202. For example, destination identifier 216 for an InfiniBand packet may be specified using a 16-bit destination local identifier (DLID) in a Local Routing Header (LRH) of the packet. Service level (SL) 218 may be used to define a requested Quality of Service (QoS) level for packet 202. For example, an LRH of an InfiniBand packet may specify one of 16 SLs associated with traffic isolation, policy enforcement, and/or non-blocking behavior in the switch fabric.

A forwarding table 204 containing mappings of destination identifiers 220 in the switch fabric to a set of virtual port numbers 222 may be used to identify a destination virtual port number 228 associated with destination identifier 216. For example, forwarding table 204 may be a linear forwarding table for an InfiniBand switch that specifies output ports for InfiniBand destinations represented by a set of DLIDs.

In one or more embodiments, virtual port numbers 222 are used to identify the second set of physical ports in lieu of valid physical port numbers in the switch fabric. For example, each virtual port number in forwarding table 204 may identify a different physical port in an Ethernet gateway connected to an InfiniBand switch fabric. However, because the second set of physical ports is connected to the switch fabric using a single physical link, the second set of physical ports may share a single physical port number in the switch fabric. Virtual port numbers 222 may thus represent abstractions that give generic fabric-management software like an InfiniBand Subnet Manager the illusion that no single physical link provides connectivity between the InfiniBand fabric and the second set of physical ports. Instead, virtual port numbers 222 may be mapped to the second set of physical ports using a switching apparatus (e.g., switching apparatus 114 of FIG. 1) implemented in hardware and/or firmware of the switch fabric.

The virtual port numbers can further be used to give a Subnet Manager the illusion that each port in the second set of physical ports is directly connected to a dedicated physical port on the InfiniBand fabric, and that the port therefore represents a unique InfiniBand fabric end port with a unique destination address. In this way, packets targeting different ports in the second set of physical ports may also be routed completely independently through the InfiniBand fabric prior to reaching their InfiniBand end-port destinations.

If needed, the implementation could also include the ability for ports in the second set of physical ports to communicate with each other on the InfiniBand fabric by supporting a loopback forwarding mechanism for the single physical port that represents the actual connectivity to the InfiniBand fabric. Thus, the implementation may address the complete set of InfiniBand features that the multiple virtual switch port abstraction implies. However, if ports in the second set of physical ports represent multiple independent gateway ports, there is no inherent need for the gateway ports to send packets between one another via the InfiniBand fabric, and hence this extra implementation complexity can be avoided.

An alternative abstraction is to provide a representation of the connectivity between the single physical port and the second set of physical ports as a second InfiniBand switch with one port connecting the single physical port and other ports connecting each of the ports in the second set of physical ports. This abstraction maintains the notion that each port in the second set of physical ports represents an individual end-port on the InfiniBand fabric with a unique InfiniBand address, but does inherently imply that any limitations associated with a single intermediate InfiniBand link are still present in the model.

In either abstraction model, it is possible to handle any static or dynamic configuration and connectivity for the ports in the second set of physical ports by representing change in the configuration as virtual InfiniBand hot-plug/un-plug operations that will lead to changes in which virtual switch ports are currently connected as well as which virtual end port is currently connected to a virtual switch port. The only model limitation is that the sum of physical and virtual switch ports for any InfiniBand switch representation cannot exceed the 255 ports that the InfiniBand specification defines as the maximum number of external ports for an InfiniBand switch.

A set of mappings 206 of SLs 224 to virtual links 226 in the switch fabric may also be used to identify a target virtual link 230 associated with service level 218. For example, mappings 206 may be stored in an SL-to-VL mapping table for an InfiniBand switch. The SL-to-VL mapping table may allow an abstract SL 218 in packet 202 to be mapped to a concrete VL in the switch fabric. As a result, SL 218 may allow flow control and QoS to be provided as packet 202 is routed among InfiniBand switches with differing numbers of VLs.

Destination virtual port number 228 and target virtual link 230 may then be used to identify a VOQ 232 of physical port 236, and packet 202 may be placed in VOQ 232. Because VOQ 232 is identified by a combination of destination virtual port number 228 and target virtual link 230, enough VOQs may be provided to prevent head-of-line blocking among physical port 236 and other physical ports in the second set of physical ports. For example, the switch fabric may support 42 ports in the second set of physical ports and nine virtual links. As a result, each input port in the first set of physical ports (e.g., physical port 234) may have 42×9, or 378, VOQs for the second set of physical ports.

For example, ports 37-40 of an InfiniBand switch may map to four Ethernet gateways, each containing four independent 10-Gigabit Ethernet ports. A lookup of forwarding table 204 that results in a destination virtual port number (e.g., destination virtual port number 228) of 37, 38, 39, or 40 may cause traffic to be sent to the corresponding gateway, and target virtual link 230 may be identified using mappings 206 in an SL-to-VL mapping table. Such transmission of data to ports 37-40 may occur during use of the gateways in 40-Gigabit Ethernet gateway mode and/or if the Ethernet gateways are disabled and the corresponding ports are used as InfiniBand ports.

Virtual port numbers representing the Ethernet ports may start at 64, since 0-63 may be valid InfiniBand port numbers. Ports 64-71 may be virtual port numbers that encode individual Ethernet ports in the Ethernet gateway corresponding to port 37. In particular, ports 64-65 may represent the first Ethernet port of the gateway, ports 66-67 may represent the second Ethernet port of the gateway, ports 68-69 may represent the third Ethernet port of the gateway, and ports 70-71 may represent the fourth Ethernet port of the gateway. Similarly, ports 72-79 may be assigned to the four Ethernet ports of the gateway represented by port 38, ports 80-87 may be assigned to the four Ethernet ports of the gateway represented by port 39, and ports 88-95 may be assigned to the four Ethernet ports of the gateway represented by port 40.

In addition, each virtual port number may be associated with up to two VLs; if only one VL is used, values in the SL-to-VL mapping table may all be set to 0. Ports 64-65 may be associated with VL0 or VL1, with the target VL specified by the value of 0 or 1 in the SL-to-VL mapping table. Ports 66-67 may be associated with VL2 or VL3, with the target VL specified by the sum of VL2 and the value of 0 or 1 in the SL-to-VL mapping table. Ports 68-69 may be associated with VL4 or VL5, with the target VL specified by the sum of VL4 and the value of 0 or 1 in the SL-to-VL mapping table. Ports 70-71 may be associated with VL6 or VL7, with the target VL specified by the sum of VL6 and the value of 0 or 1 in the SL-to-VL mapping table. The target VLs and virtual port numbers may then be mapped to separate VOQs on each input port of the InfiniBand switch to provide non-blocking behavior among the Ethernet ports of the gateway Consequently, destination virtual port number 228 may be used to remap the same SL (e.g., SL 218) to different virtual links so that any SL and/or virtual link can be overloaded with multiple QoS levels. For example, an arbitration scheme such as InfiniBand VL arbitration and/or a fair-queuing scheme may be applied to VOQ 232 and other VOQs for physical port 236 to provide multiple QoS levels for traffic routed to physical port 236. Additional virtual port numbers (e.g., virtual port numbers 222) for a given physical port may be used to trigger lookups of packet (e.g., packet 202) headers that further extend the QoS levels. The additional lookup may or may not result in modifications to the packet headers.

Once packet 202 is in VOQ 232, packet 202 may be removed from VOQ 232 based on a fullness of an output buffer for physical port 236 and/or the QoS level associated with VOQ 232. For example, packet 202 may be buffered in VOQ 232 until packet 202 is scheduled for processing by physical port 236 and/or the output buffer of physical port 236 is capable of accepting packet 202. Consequently, other physical ports in the second set of physical ports may not be affected by increased latency at physical port 236 that may be caused by slowness, pausing (e.g., Ethernet pause), and/or a burst of traffic to physical port 236.

Conversely, a conventional lookup scheme for the switch fabric may only produce one port number for physical port 236 and other physical ports in the second set of physical ports. Moreover, only one target virtual link 230 may be available from mappings 206. As a result, the switch may not be able to distinguish between different physical ports in the second set of physical ports, and blocking behavior in the second set of physical ports may reduce the overall bandwidth of the second set of physical ports.

Figure 3:
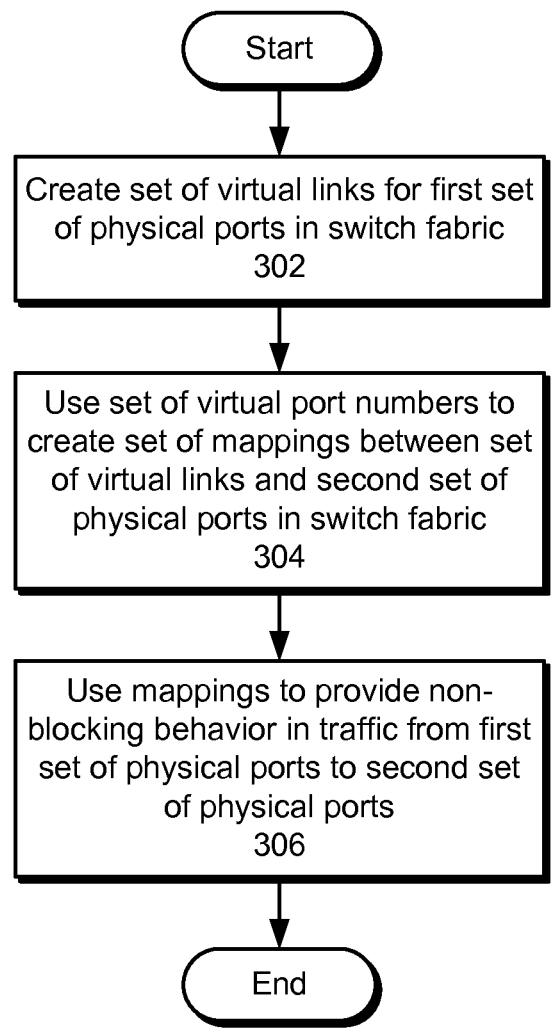
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a set of virtual links is created for a first set of physical ports in the switch fabric (operation 302). For example, up to 16 VLs representing the virtual links may be created in an InfiniBand switch fabric. Next, a set of virtual port numbers is used to create a set of mappings between the set of virtual links and a second set of physical ports in the switch fabric (operation 304). The second set of physical ports may be connected to the first set of physical ports using a single physical link. For example, the second set of physical ports may include InfiniBand ports and/or Ethernet ports, which are connected to a first set of InfiniBand ports in an InfiniBand switch fabric using a single InfiniBand link.

The mappings may include a first mapping from a unique destination identifier of a destination in the switch fabric to a virtual port number and a second mapping from an SL associated with a packet to a virtual link. The unique destination identifier may be associated with one or more ports in the second set of physical ports. The virtual port number and the virtual link may additionally be associated with a virtual output queue (VOQ) of a physical port from the second set of physical ports. As a result, the virtual port number may represent an abstraction of a physical port in the second set of physical ports and enable overloading of the SL and/or virtual link with multiple QoS levels and/or isolated traffic flows.

Finally, the mappings are used to provide non-blocking behavior in traffic from the first set of physical ports to the second set of physical ports (operation 306). For example, the first and second mappings may be used to place a packet containing the destination identifier and the service level in the VOQ. The packet may then be removed from the VOQ based on a fullness of an output buffer for the physical port and/or a QoS level associated with the VOQ.

Figure 4:
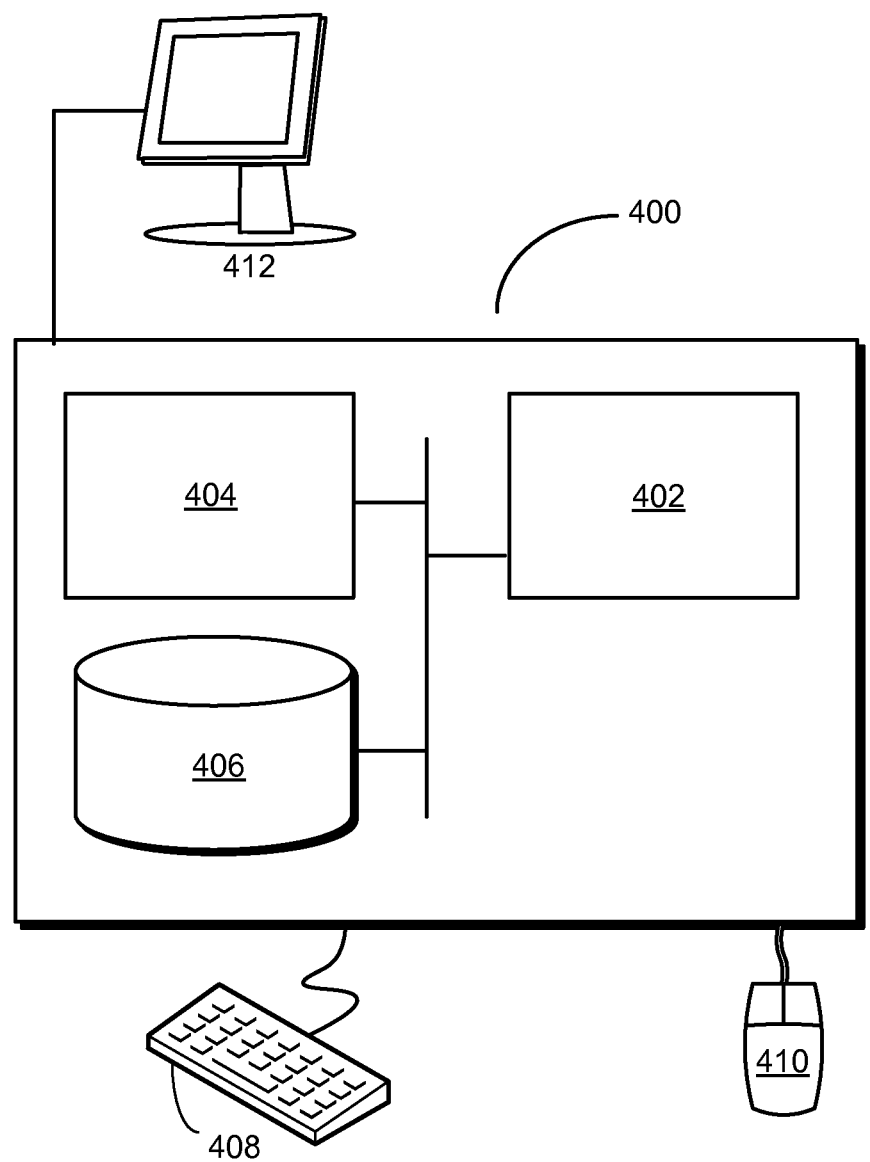
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for operating a switch fabric. The switch fabric may include a first set of physical ports and a second set of physical ports connected to the first set of physical ports using a single physical link. The system may provide a switching apparatus that creates a set of virtual links for a first set of physical ports in the switch fabric. Next, the switching apparatus may use a set of virtual port numbers to create a set of mappings between the set of virtual links and the second set of physical ports. Finally, the switching apparatus may use the mappings to provide non-blocking behavior in traffic from the set of virtual links to the second set of physical ports.

In addition, one or more components of computer system 400 may be remotely located and connected to the other components over a network. Portions of the present embodiments (e.g., physical ports, switch fabric, gateway, physical link, switching apparatus, etc.) may also be located on different nodes of a distributed system that implements the embodiments. For example, the present embodiments may be implemented using a cloud computing system that provides non-blocking behavior in two sets of remote physical ports connected using a single physical link.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for operating a switch fabric, comprising:
   creating a set of virtual links for a first set of physical ports in the switch fabric;
   using a set of virtual port numbers to create a set of mappings between the set of virtual links and a second set of physical ports in the switch fabric, wherein the second set of physical ports is connected to the first set of physical ports using a single physical link;
   creating a first mapping from a unique destination identifier associated with one or more ports in the second set of physical ports to a virtual port number;
   creating a second mapping from a service level associated with a packet to a virtual link from the set of virtual links; and associating the virtual port number and the virtual link with a virtual output queue (VOQ) of a physical port from the second set of physical ports;
   using the mappings to provide non-blocking behavior in traffic from the first set of physical ports to the second set of physical ports; and
   using the first and second mappings to place a packet comprising the unique destination identifier and the service level in the VOQ;
   and removing the packet from the VOQ based on a fullness of an output buffer for the physical port.

2. The computer-implemented method of claim 1, wherein removal of the packet from the VOQ is further based on a Quality of Service (QoS) level associated with the VOQ.

3. The computer-implemented method of claim 2, wherein the QoS level is associated with at least one of the service level and the virtual port number.

4. The computer-implemented method of claim 1, wherein each of the second set of physical ports is associated with one or more of the virtual links.

5. The computer-implemented method of claim 1, wherein the switch fabric comprises an InfiniBand switch fabric and an Ethernet gateway.

6. The computer-implemented method of claim 5, wherein the first set of physical ports comprises InfiniBand ports, and wherein the second set of physical ports comprises Ethernet ports.

7. A switch fabric, comprising:
    a first set of physical ports;
    a second set of physical ports connected to the first set of physical ports using a single physical link;
    and a switching apparatus configured to: create a set of virtual links for a first set of physical ports in the switch fabric;
    use a set of virtual port numbers to create a set of mappings between the set of virtual links and the second set of physical ports;
    creating a first mapping from a unique destination identifier associated with one or more ports in the second set of physical ports to a virtual port number;
    creating a second mapping from a service level associated with a packet to a virtual link from the set of virtual links;
    associating the virtual port number and the virtual link with a virtual output queue (VOQ) of a physical port from the second set of physical ports;
    use the mappings to provide non-blocking behavior in traffic from the set of virtual links to the second set of physical ports;
    using the first and second mappings to place a packet comprising the unique destination identifier and the service level in the VOQ; and
    removing the packet from the VOQ based on a fullness of an output buffer for the physical port.

8. The switch fabric of claim 7, wherein removal of the packet from the VOQ is further based on a Quality of Service (QoS) level associated with the VOQ.

9. The switch fabric of claim 8, wherein the QoS level is further associated with at least one of the service level and the virtual port number.

10. The switch fabric of claim 7, wherein the switch fabric comprises an InfiniBand switch fabric and an Ethernet gateway.

11. A non-transitory computer-readable storage medium storing instructions that when executed by a computer cause the computer to perform a method for operating a switch fabric, comprising:
    creating a set of virtual links for a first set of physical ports in the switch fabric;
    using a set of virtual port numbers to create a set of mappings between the set of virtual links and a second set of physical ports in the switch fabric, wherein the second set of physical ports is connected to the first set of physical ports using a single physical link;
    creating a first mapping from a unique destination identifier associated with one or more ports in the second set of physical ports to a virtual port number;
    creating a second mapping from a service level associated with a packet to a virtual link from the set of virtual links;
    associating the virtual port number and the virtual link with a virtual output queue (VOQ) of a physical port from the second set of physical ports;
    using the mappings to provide non-blocking behavior in traffic from the set of virtual links to the second set of physical ports;
    using the first and second mappings to place a packet comprising the unique destination identifier and the service level in the VOQ; and
    removing the packet from the VOQ based on a fullness of an output buffer for the physical port.

12. The computer-readable storage medium of claim 11, wherein removal of the packet from the VOQ is further based on a Quality of Service (QoS) level associated with the VOQ.

13. The computer-readable storage medium of claim 11, wherein each of the second set of physical ports is associated with one or more of the virtual links.

14. The computer-readable storage medium of claim 11, wherein the switch fabric comprises an InfiniBand switch fabric and an Ethernet gateway.

* * * * *